United States Patent
Zhong

(10) Patent No.: US 10,274,763 B2
(45) Date of Patent: Apr. 30, 2019

(54) VISUAL ANGLE REGULATOR AND LIQUID CRYSTAL DISPLAY

(71) Applicant: WUHAN CHINA STAR OPTOELECTRONICS TECHNOLOGY CO., LTD., Wuhan, Hubei (CN)

(72) Inventor: Xinhui Zhong, Hubei (CN)

(73) Assignee: WUHAN CHINA STAR OPTOELECTRONICS TECHNOLOGY CO., LTD., Wuhan, Hubei (CN)

( * ) Notice: Subject to any disclaimer, the term of this patent is extended or adjusted under 35 U.S.C. 154(b) by 189 days.

(21) Appl. No.: 15/124,643

(22) PCT Filed: Jun. 3, 2016

(86) PCT No.: PCT/CN2016/084763
§ 371 (c)(1),
(2) Date: Sep. 8, 2016

(87) PCT Pub. No.: WO2017/152523
PCT Pub. Date: Sep. 14, 2017

(65) Prior Publication Data
US 2018/0088367 A1    Mar. 29, 2018

(30) Foreign Application Priority Data

Mar. 8, 2016   (CN) .......................... 2016 1 0128956

(51) Int. Cl.
*F21V 8/00* (2006.01)
*G02F 1/13* (2006.01)
(Continued)

(52) U.S. Cl.
CPC ........... *G02F 1/1323* (2013.01); *G02B 6/003* (2013.01); *G02B 27/2214* (2013.01);
(Continued)

(58) Field of Classification Search
CPC ........... G02F 1/1323; G09G 3/34; G09G 3/36
See application file for complete search history.

(56) References Cited

U.S. PATENT DOCUMENTS 5,299,289 A * 3/1994 Omae ................ G02F 1/133371
348/E9.027
5,877,829 A * 3/1999 Okamoto .............. G02F 1/1323
349/74
(Continued)

FOREIGN PATENT DOCUMENTS

CN       101968595 A     2/2011
CN       103383505 A    11/2013
(Continued)

*Primary Examiner* — Kevin M Nguyen
(74) *Attorney, Agent, or Firm* — Muncy, Geissler, Olds & Lowe, P.C.

(57) ABSTRACT

A visual angle regulator of a Liquid Crystal Display (LCD) is arranged between an LCD panel and a backlight. When the visual angle regulator is applied with a voltage, the LCD is in a narrow visual angle mode. When the visual angle regulator is not applied with a voltage, the LCD is in a wide visual angle mode, which allows the LCD to have the wide visual angle mode and the narrow visual angle mode.

20 Claims, 3 Drawing Sheets

(51) Int. Cl.
*G02F 1/29* (2006.01)
*G02B 27/22* (2018.01)
*G02F 1/137* (2006.01)
*G02F 1/1333* (2006.01)
*G02F 1/1343* (2006.01)
*G02F 1/1347* (2006.01)
*G02F 1/13357* (2006.01)

(52) U.S. Cl.
CPC .......... *G02F 1/1336* (2013.01); *G02F 1/1347* (2013.01); *G02F 1/13439* (2013.01); *G02F 1/133345* (2013.01); *G02F 1/134363* (2013.01); *G02F 1/29* (2013.01); *G02F 2001/13712* (2013.01)

(56) References Cited

U.S. PATENT DOCUMENTS

| | | | |
|---|---|---|---|
| 2005/0219445 A1* | 10/2005 | Kubo | G02F 1/1323 |
| | | | 349/110 |
| 2008/0284715 A1 | 11/2008 | Kawata | |
| 2012/0092586 A1 | 4/2012 | He | |
| 2014/0104541 A1 | 4/2014 | Park et al. | |
| 2015/0301364 A1 | 10/2015 | Feng | |

FOREIGN PATENT DOCUMENTS

| | | |
|---|---|---|
| CN | 103728768 A | 4/2014 |
| GB | 2428100 A | 1/2007 |

* cited by examiner

VISUAL ANGLE REGULATOR AND LIQUID CRYSTAL DISPLAY

This application claims the benefit and priority of Chinese Patent Application No. CN201610128956.9, filed Mar. 8, 2016, and entitled "Visual Angle Regulator and Liquid Crystal Display". The entire disclosures of the above application are incorporated herein by reference.

BACKGROUND OF THE INVENTION

1. Field of the Invention

The present disclosure relates to the field of display technique, and more particularly to a visual angle regulator and a Liquid Crystal Display (LCD) using the visual angle regulator.

2. Description of the Prior Art

At present, a Liquid Crystal Display (LCD) is one of the most widely used in flat display devices, such as smart phones, computers, and televisions. With the continuous development of internet technology and the emergence of various kinds of application software, users can do most things in life and work by the smart phone or a PAD, such as online shopping, chatting, video watching, fee payment on internet, e-payment, and stocks investment.

In most situations, users expect or do not mind sharing information on the display with people around them, which requires the display to have a very wide visual angle. In order to improve the visual angle of the display, the LCD basically uses Fringe Field Switching (FFS) or In Plan Switching (IPS) on the current market to improve the visual angle. However, in some situations, the users are afraid of or do not expect the personal information on the display being seen by people around them. For example, when the users do the e-payment by phone, the people around them may see bank account information on the display of the phone because the phone has a wide visual angle, which brings troubles and inconvenience to the users' life.

Therefore, it is necessary to provide the LCD which can switch between wide visual angle and narrow visual angle. When the users do not expect people around them see the information on the display, the LCD is switched to the narrow visual angle. When users do not mind people around them see the information on the display, the LCD is switched to the wide visual angle.

SUMMARY OF THE INVENTION

The aim of the present disclosure is to provide a visual angle regulator to solve collimation light perpendicular to the visual angle regulator generates divergency because of the reflection when a wide visual angle is needed and propagation direction of light of one polarization direction of the collimation light is unchanged when a narrow visual angle is needed. The aim of the present disclosure is also to provide a Liquid Crystal Display (LCD) to solve the problem that the LCD only having the wide visual angle in prior art cannot achieve to switch the wide visual angle mode and the narrow visual angle mode.

The LCD comprises a backlight, an LCD panel comprising a lower polaroid, and a visual angle regulator attached to the LCD panel by optical transparent glue and arranged between the LCD panel and the backlight.

The visual angle regulator comprises substrates, electrodes, a polymer layer, and a negative liquid crystal layer. The substrates comprise an upper substrate and a lower substrate opposite to the upper substrate. The electrode is arranged between the upper substrate and the lower substrate, and the electrode comprises an upper electrode attached to the upper substrate and a lower electrode attached to the lower substrate.

The polymer layer is arranged between the upper electrode and the lower electrode, where a first side of the polymer layer is attached to the upper electrode and a second side of the polymer layer has a liner grooved structure formed with periodic grooves. An extension direction of each of the grooves of the linear grooved structure is either parallel or perpendicular to a light absorption axis direction of the lower polaroid of the LCD panel, and a cross-section of each of the grooves of the linear grooved structure is a circular arc.

The negative liquid crystal layer is filled between the polymer layer and the lower electrode. Refractive index of the polymer layer is a maximal same as refractive index of the extraordinary light of the negative liquid crystal layer.

In the LCD of the present disclosure, when the visual angle regulator is not applied with a voltage, the backlight emits collimation light, and the collimation light generates refraction to diverge by the visual angle regulator; and at this same time, the LCD is in a wide visual angle mode; when the visual angle regulator is applied with the voltage, the backlight emits the collimation light, and the light with a polarization direction which is parallel to a long axis direction of the negative liquid crystal molecules has a propagation direction which is unchanged, and light with a polarization direction which is perpendicular to the long axis direction of the negative liquid crystal molecules is absorbed by the lower polaroid, and at this same time, the LCD is in a narrow visual angle mode.

In the LCD of the present disclosure, the visual angle regulator further comprises an alignment layer comprising an upper alignment layer and a lower alignment layer, where the upper alignment is arranged between the polymer and the negative liquid crystal layer, and the lower alignment layer is arranged between the lower electrode and the negative liquid crystal layer.

In the LCD of the present disclosure, the visual angle regulator further comprises an alignment layer comprising an upper alignment layer and a lower alignment layer, where the upper alignment is arranged between the polymer layer and the negative liquid crystal layer, and the lower alignment layer is arranged between the lower electrode and the negative liquid crystal layer.

In the LCD of the present disclosure, when the visual angle regulator is applied with a voltage, the polarization direction of the negative liquid crystal molecules comprise a first direction parallel to the extension direction of the grooves of the linear grooved structure or a second direction perpendicular to the extension direction of the grooves of the linear grooved structure.

In the LCD of the present disclosure, when the visual angle regulator is applied with a voltage, the polarization direction of the negative liquid crystal molecules comprise a first direction parallel to the extension direction of the grooves of the linear grooved structure or a second direction perpendicular to the extension direction of the grooves of the linear grooved structure.

The present disclosure provides the visual angle regulator, where the visual angle regulator comprises substrates comprising an upper substrate and a lower substrate opposite to the upper substrate, an electrode comprising an upper electrode attached to the upper substrate and a lower electrode attached to the lower substrate, polymer layer arranged between the upper electrode and the lower electrode, and a negative liquid crystal layer filled between the polymer layer and the lower electrode.

The electrodes are arranged between the upper substrate and the lower substrate, a first side of the polymer layer is attached to the upper electrode, and a second side of the polymer layer has a linear grooved structure formed with periodic grooves, a refractive index of the polymer layer is the same as a maximum refractive index of an extraordinary light of the negative liquid crystal layer.

In the visual angle regulator of the present disclosure, when the electrode is not applied with a voltage, and collimation light perpendicular to the lower substrate enters an interface between the negative liquid crystal layer and the polymer layer, the collimation light generates divergency because of refraction, and at this same time, the visual angle regulator is in a first working state. When the electrode is applied with a voltage, the negative liquid crystal molecules generate deflection, light with polarization direction which is parallel to the long axis direction of the negative liquid crystal molecules has a propagation direction which is unchanged, and at this time, the visual angle regulator is in a second working state.

In the visual angle regulator of the present disclosure, the visual angle regulator further comprises an alignment layer comprising an upper alignment layer and a lower alignment layer, where the upper alignment is arranged between the polymer layer and the negative liquid crystal layer, and the lower alignment layer is arranged between the lower electrode and the negative liquid crystal layer.

In the visual angle regulator of the present disclosure, when the negative liquid crystal molecules generate reflection, the polarization direction of the negative liquid crystal molecules comprise a first direction parallel to an extension direction of the grooves of the linear grooved structure or a second direction perpendicular to the extension direction of the grooves of the linear grooved structure.

In the visual angle regulator of the present disclosure, a cross-section of each of the grooves of the linear grooved structure is a circular arc.

The present disclosure provides the other LCD, where the other LCD comprises a backlight, an LCD panel comprising a lower polaroid, and a visual angle regulator attached to the LCD panel and arranged between the LCD panel and the backlight.

The visual angle regulator comprises substrates, electrodes, a polymer layer, and a negative liquid crystal layer. The substrates comprise an upper substrate and a lower substrate opposite to the upper substrate. The electrodes are arranged between the upper substrate and the lower substrate, and the electrodes comprise an upper electrode attached to the upper substrate and a lower electrode attached to the lower substrate.

The polymer layer is arranged between the upper electrode and the lower electrode, where a first side of the polymer layer is attached to the upper electrode and a second side of the polymer layer has a liner grooved structure formed with periodic grooves. An extension direction of each of the grooves of the linear grooved structure is either parallel or perpendicular to a light absorption axis direction of the lower polaroid of the LCD panel.

The negative liquid crystal layer is filled between the polymer layer and the lower electrode. Refractive index of the polymer layer is a maximal same as refractive index of the extraordinary light of the negative liquid crystal layer.

In the other LCD of the present disclosure, when the visual angle regulator is not applied with a voltage, the backlight emits collimation light, and the collimation light generates refraction to diverge by the visual angle regulator; and at this same time, the LCD is in a wide visual angle mode; when the visual angle regulator is applied with a voltage, the backlight emits the collimation light, and the light with a polarization direction which is parallel to a long axis direction of the negative liquid crystal molecules has a propagation direction which is unchanged, and light with a polarization direction which is perpendicular to the long axis direction of the negative liquid crystal molecules is absorbed by the lower polaroid, and at this same time, the LCD is in a narrow visual angle mode.

In the other LCD of the present disclosure, the visual angle regulator further comprises an alignment layer comprising an upper alignment layer and a lower alignment layer, where the upper alignment is arranged between the polymer layer and the negative liquid crystal layer, and the lower alignment layer is arranged between the lower electrode and the negative liquid crystal layer.

In the other LCD of the present disclosure, when the visual angle regulator is applied with a voltage, the polarization direction of the negative liquid crystal molecules comprise a first direction parallel to the extension direction of the grooves of the linear grooved structure or a second direction perpendicular to the extension direction of the grooves of the linear grooved structure.

In the other LCD of the present disclosure, the visual angle regulator is attached with the LCD panel by but not limiting to use optical transparent glue.

Compared with prior art, the present disclosure provides the visual angle regulator. According to the polymer having the refractive index same as the maximal refractive index of the extraordinary light and the polymer layer having the linear grooved structure, the electrodes are applied with a voltage the negative liquid crystal molecules generate deflection, which makes the propagation direction of the second light of the collimation light unchanged. When the electrode is not applied with the voltage, the collimation light generates divergency because of the refraction.

The present disclosure further provides the LCD, where the LCD uses the visual angle regulator is arranged between the LCD panel and the backlight. When the visual angle regulator is applied with a voltage, the LCD is in the narrow visual angle mode. When the visual angle regulator is not applied with a voltage, the LCD is in the wide visual angle mode. Therefore, the present disclosure solves the problem that the LCD only having the wide visual angle in prior art cannot achieve to switch the wide visual angle mode and the narrow visual angle mode

Figure 1:
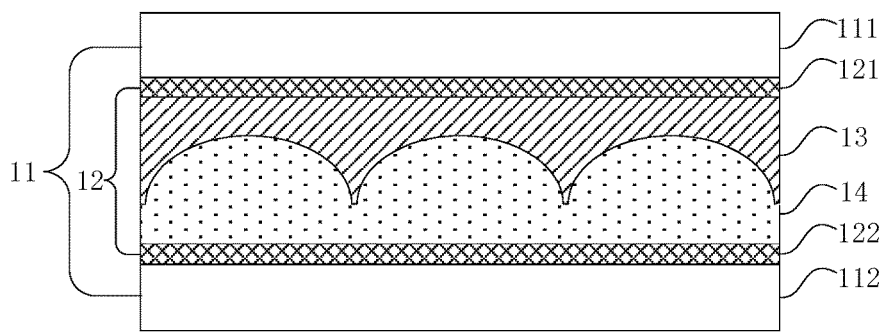
FIG. 1 is a structural diagram of a visual angle regulator of the present disclosure.

Note: From FIG. 5 to FIG. 9, a double-headed arrow at each of top right corners of the drawings represents that the polarized direction of the horizontal polarized light is parallel to the principal plane of the drawing sheet. A circled dot thereat represents that the polarized direction of the vertical polarized light is perpendicular to the principal plane of the drawing sheet.

DETAILED DESCRIPTION OF THE PREFERRED EMBODIMENTS

In order to more clearly illustrate the present disclosure or the technology of the present art, a description is made to the drawings which are needed for carrying out the embodiments. The drawings described hereinafter are only related to some embodiments of the present disclosure. A person skilled in the art, without spending too many endeavors, should be able to obtain other drawings from the disclosed drawings.

In the drawings, a same reference number stands for a same element.

Please refer to FIG. 1, which is a structural diagram of a visual angle regulator of the present disclosure. The visual angle regulator of the embodiment of the present disclosure comprises substrates 11, electrodes 12, a polymer layer 13, and a negative liquid crystal layer 14.

The substrates comprise an upper substrate 111 and a lower substrate 112 opposite to the upper substrate 111, where the substrates each have a high light transmission.

The electrodes 12 are arranged between the upper substrate 111 and the lower substrate 112, and the electrodes comprises an upper electrode 121 attached to the upper substrate 111 and a lower electrode 122 attached to the lower substrate 112. The electrodes 12 provide an electric field having a vertical direction to the negative liquid crystal layer 14. The electric field causes negative liquid crystal molecules of the negative liquid crystal layer 14 to deflect. The vertical direction is perpendicular to the substrates 11.

The polymer layer 13 has a high light transmission, and a refractive index of the polymer layer 13 is the same as a maximum refractive index of an extraordinary light for the negative liquid crystal layer 14. The polymer layer 13 is arranged between the upper electrode 121 and the lower electrode 122, and a first side of the polymer layer 13 is attached to the upper electrode 121, and a second side of the polymer layer 13 away from the upper electrode 121 forms a structure having periodically arranged grooves along a line. A cross-section of each of the grooves is a circular arc. It should be understood that the cross section of the groove can be a semicircle or other similar shape, which are not disclosed in the specification.

The negative liquid crystal layer 14 is filled between the polymer layer 13 and the lower electrode 122.

In the embodiment of the present disclosure, the visual angle regulator can further comprise an alignment layer comprising an upper alignment layer and a lower alignment layer, where the upper alignment layer is arranged between the polymer layer and the negative liquid crystal layer, and the lower alignment layer is arranged between the lower electrode and the negative liquid crystal layer. The alignment layer is not shown in FIG. 1; however, according to content of the specification and common knowledge, a person of ordinary skill in the art can easily know the location of the alignment layer.

Figure 2:
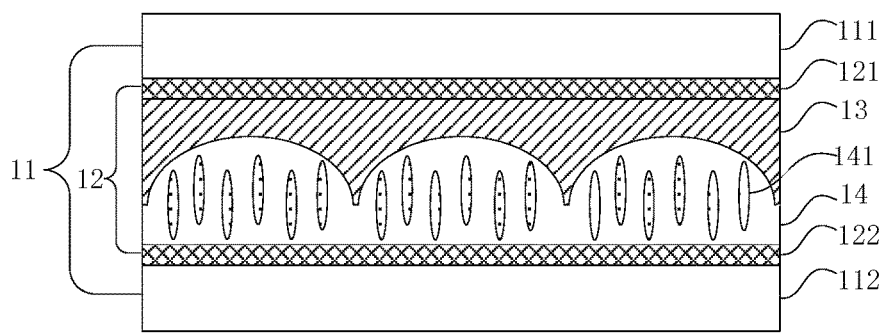
FIG. 2 is a schematic diagram of an orientation of negative liquid crystal molecules, when electrodes of the visual angle regulator of the present disclosure are not applied with a voltage.

Please refer to FIG. 2, which is a schematic diagram of an orientation of negative liquid crystal molecules 141, when electrodes 12 of the visual angle regulator of the present disclosure are not applied with a voltage. In the embodiment, when the electrodes 12 of the visual angle regulator is not applied with a voltage, long axis direction of the negative liquid crystal molecules 141 is perpendicular to the substrates 11.

Figure 3:
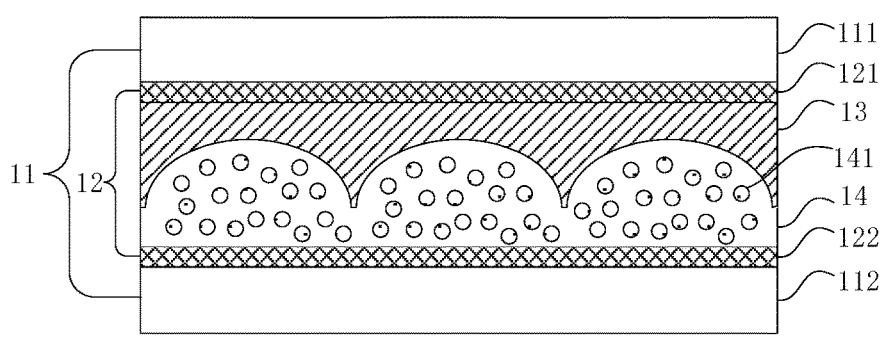
FIG. 3 is a schematic diagram of a first polarization direction of the negative liquid crystal molecules of the visual angle regulator of the present disclosure.
Figure 4:
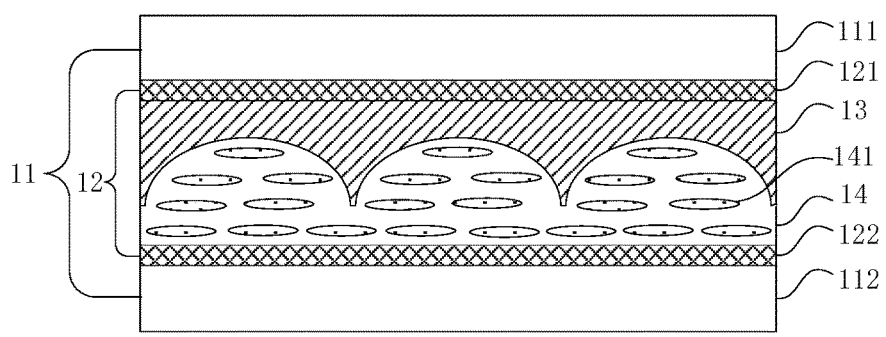
FIG. 4 is a schematic diagram of a second polarization direction of the negative liquid crystal molecules of the visual angle regulator of the present disclosure.

In the embodiment of the present disclosure, when the electrodes 12 of the visual angle regulator are applied with a voltage, the negative liquid crystal molecules 141 generates deflection, and state of the deflection of the negative liquid crystal molecules is shown in FIG. 3 and FIG. 4.

Please refer to FIG. 3, which is a schematic diagram of a first polarization direction of the negative liquid crystal molecules of the visual angle regulator of the present disclosure. The first polarization direction of the negative liquid crystal molecules is that the long axis direction of the negative liquid crystal molecules is deflected to be parallel to an extension direction of the grooves of the linear grooved structure.

Please refer to FIG. 4, which is a schematic diagram of a second polarization direction of the deflection of the negative liquid crystal molecules of the visual angle regulator of the present disclosure. The second polarization direction of the negative liquid crystal molecules is that the long axis direction of the negative liquid crystal molecules is deflected to be perpendicular to the extension direction of the grooves of the linear grooved structure.

An operating principle of the visual angle regulator will be further described in detail.

First, it should be noted that the negative liquid crystal layer 14 has double refraction and the long axis direction of the negative liquid crystal molecules 141 is an optical axis direction. When collimation light enters along a direction parallel to the optical axis direction of the negative liquid crystal layer 14, the negative liquid crystal layer 14 is isotropy. Refractive index of the negative liquid crystal layer 14 is the same as the refractive index of ordinary light. When the collimation light does not enter along the direction parallel to the optical axis direction of the negative liquid crystal layer 14, the collimation light is divided into two lights because of the negative liquid crystal having the double refraction, where a first light is ordinary light and a second light is the extraordinary light. Refractive indexes of the ordinary light are the same along different propagation directions and the refractive index is a predetermined value. Refractive indexes of the extraordinary light are different along different propagation directions. When the collimation light enters along the direction perpendicular to the optical axis direction of the negative liquid crystal layer 14, the refractive index of the extraordinary light is maximum, and the maximum refractive index of the extraordinary light is greater than the value of the refractive index of the ordinary light.

Figure 5:
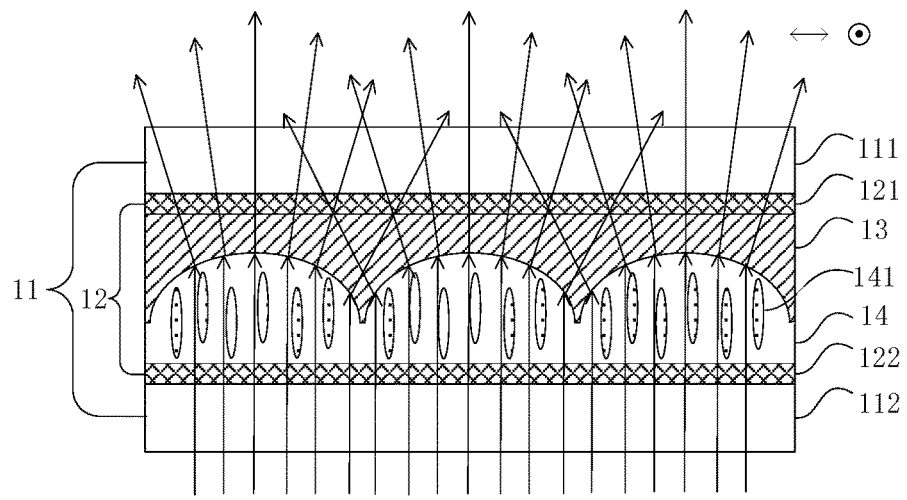
FIG. 5 is a schematic diagram of an optical path of the visual angle regulator in a first working state of the present disclosure.
Figure 6:
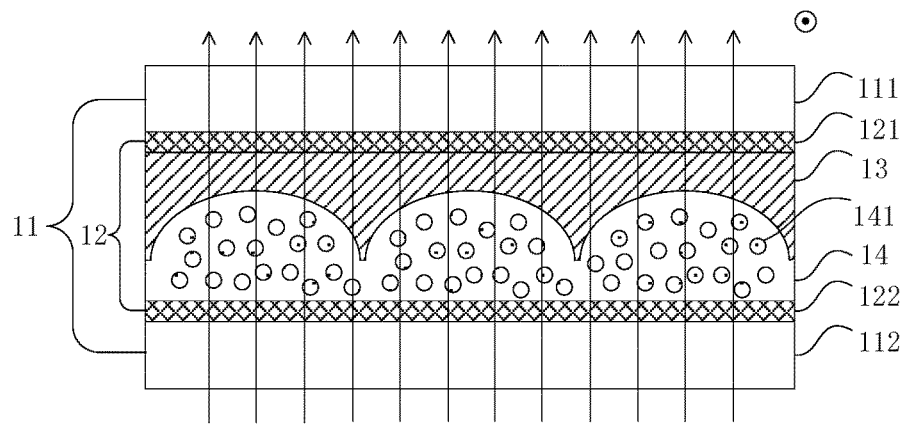
FIG. 6 is a schematic diagram of an optical path of a vertical polarized light of the visual angle regulator in a second working state of the present disclosure.
Figure 7:
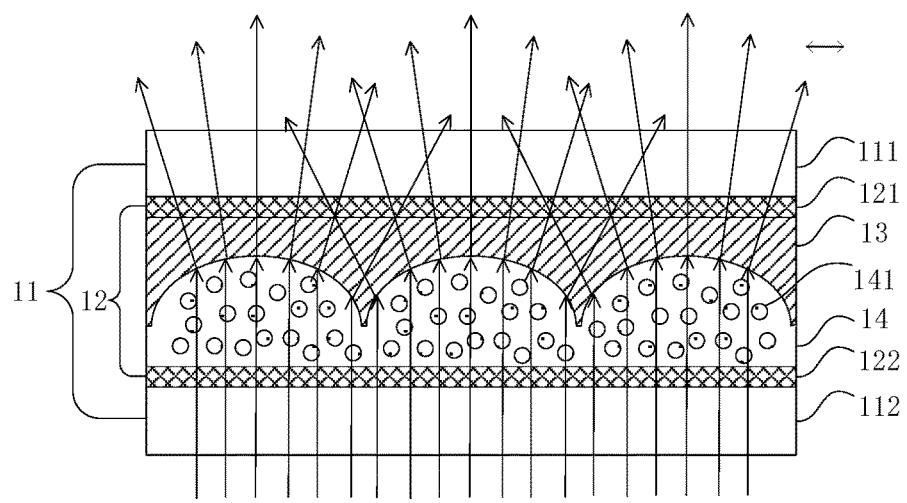
FIG. 7 is a schematic diagram of an optical path of a horizontal polarized light of the visual angle regulator in the second working state of the present disclosure.
Figure 8:
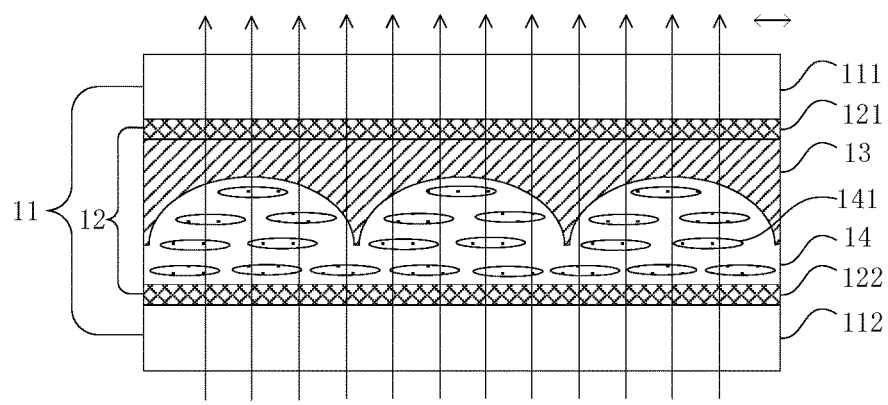
FIG. 8 is a schematic diagram of another optical path of the horizontal polarized light of the visual angle regulator in the second working state of the present disclosure.
Figure 9:
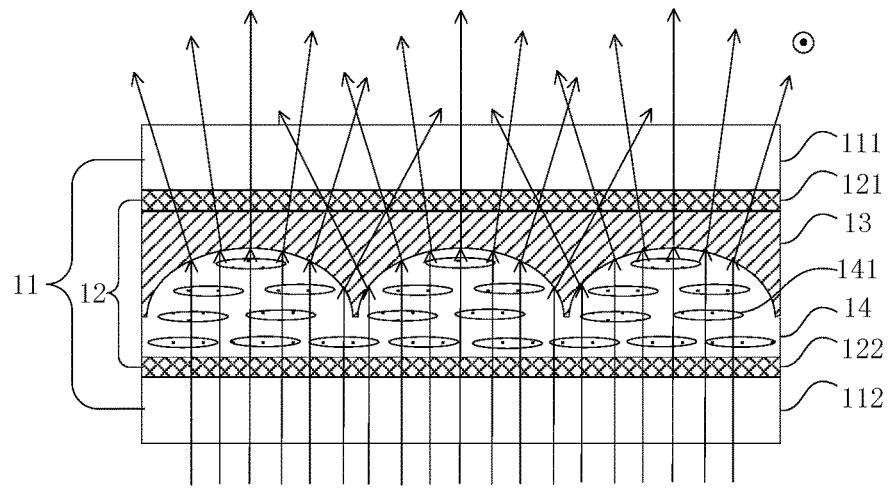
FIG. 9 is a schematic diagram of still another optical path of the horizontal polarized light of the visual angle regulator in the second working state of the present disclosure.

Please refer to FIG. 5, which is a schematic diagram of an optical path of the visual angle regulator in a first working state of the present disclosure.

When the visual angle regulator is in the first working state, namely, the electrodes are not applied with a voltage, the collimation light perpendicular to the lower substrate 112 enters along a direction parallel to the long axis direction of the negative liquid crystal molecules 141, and the negative liquid crystal layer 14 is isotropy and cannot generate the double refraction. At the same time, the refractive index of the negative liquid crystal layer 14 is the same as the refractive index of the ordinary light, and the refractive index of the negative liquid crystal layer 14 is less than the refractive index of the polymer layer 13. Combined with a feature of the linear grooved structure of the polymer layer 13, the polymer layer 13 is regarded as concave lens, which makes the collimation light diverge when the collimation light enters an interface between the negative liquid crystal layer 14 and the polymer layer 13.

When the visual angle regulator is in a second working state, namely, the electrodes 12 are applied with a voltage, the negative liquid crystal molecules 141 are deflected. The polarization direction of the negative liquid crystal molecules 141 comprises a first direction parallel to an extension direction of the grooves of the linear grooved structure or a second direction perpendicular to the extension direction of the grooves of the linear grooved structure. The polarization directions of the negative liquid crystal molecules 141 are different, which makes emergent light of the visual angle regulator in the second working state be different.

A working state of the visual angle regulator corresponding to the second working state will further be described in detail when the polarization directions of the negative liquid crystal molecules 141 are different.

In the first case, if the electrodes 12 are applied with a first voltage, the polarization direction of the negative liquid crystal molecules 141 is the first direction parallel to the extension direction of the grooves of the linear grooved structure as the shown in FIG. 3, namely, the optical axis direction of the negative liquid crystal layer 14 is parallel to the extension direction of the grooves of the linear grooved structure.

When the collimation light perpendicular to the lower substrate 112 enters along the direction perpendicular to the optical axis direction of the negative liquid crystal layer 14, since the negative liquid crystal layer 14 has the double refraction, the collimation light is divided into two lights. The second light is the extraordinary light, where the polarization direction of the extraordinary light is parallel to the optical axis direction of the negative liquid crystal layer 14, namely, the polarization direction of the extraordinary light is parallel to the long axis direction of the negative liquid crystal molecules 141. The refractive index of the extraordinary light is the same as the refractive index of the polymer layer 13. Therefore, when the extraordinary light enters a surface of the linear grooved structure of the polymer layer 13, the extraordinary light cannot generate refraction and propagation direction of the collimation light is unchanged, namely, the collimation light emerges along the direction perpendicular to the upper substrate 111. Please refer to FIG. 6, which is a schematic diagram of the optical path of the vertical polarized light of the visual angle regulator in the second working state of the present disclosure.

The first light obtained by the double refraction of the entered collimation light is the ordinary light, where the polarization direction of the ordinary light is perpendicular to the optical axis direction of the negative liquid crystal layer 14, namely, the polarization direction of the ordinary light is perpendicular to the long axis direction of the negative liquid crystal molecules 141. The refractive index of the ordinary light is less than the refractive index of the polymer layer 13. Combined with the feature of the grooves of the linear grooved structure of the polymer layer 13, the polymer layer 13 is regarded as concave lens, which makes the collimation light diverge when the collimation light enters a surface of the grooves of the linear grooved structure. Please refer to FIG. 7, which is a schematic diagram of the optical path of the horizontal polarized light of the visual angle regulator in the second working state of the present disclosure.

In the second case, if the electrodes 12 are applied with a second voltage, the polarization direction of the negative liquid crystal molecules 141 is the second direction perpendicular to the extension direction of the grooves of the linear grooved structure as the shown in FIG. 4, namely, the optical axis direction of the negative liquid crystal layer 14 is perpendicular to the extension direction of the grooves of the linear grooved structure.

When the collimation light perpendicular to the lower substrate 112 enters along the direction perpendicular to the optical axis direction of the negative liquid crystal layer 14, since the negative liquid crystal layer 14 has the double refraction, the collimation light is divided into two lights. The second light is the extraordinary light, where the polarization direction of the extraordinary light is parallel to the optical axis direction of the negative liquid crystal layer 14, namely, the polarization direction of the extraordinary light is parallel to the long axis direction of the negative liquid crystal molecules 141. The refractive index of the extraordinary light is the same as the refractive index of the polymer layer 13. Therefore, when the extraordinary light enters a surface of the linear grooved structure of the polymer layer 13, the extraordinary light cannot generate refraction and propagation direction of the collimation light is unchanged, namely, the collimation light emerges along the direction perpendicular to the upper substrate 111. Please refer to FIG. 8, which is another schematic diagram of the optical path of the horizontal polarized light of the visual angle regulator in the second working state of the present disclosure.

The first light obtained by the double refraction of the entered collimation light is the ordinary light, where the polarization direction of the ordinary light is perpendicular to the optical axis direction of the negative liquid crystal layer 14, namely, the polarization direction of the ordinary light is perpendicular to the long axis direction of the negative liquid crystal molecules 141. The refractive index of the ordinary light is less than the refractive index of the polymer layer 13. Combined with the feature of the grooves of the linear grooved structure of the polymer layer 13, the polymer layer 13 is regarded as concave lens, which makes the collimation light diverge when the collimation light enters a surface of the grooves of the linear grooved structure. Please refer to FIG. 9, which is the schematic diagram of another optical path of the horizontal polarized light of the visual angle regulator in the second working state of the present disclosure.

From the above, when the visual angle regulator is in the first working state, the collimation light perpendicular to the lower substrate 112 enters along the optical axis direction of the negative liquid crystal layer 14. The negative liquid crystal layer 14 is isotropy. At the same time, the refractive index of the negative liquid crystal layer 14 is the same as the refractive index of the ordinary light, and the refractive index of the ordinary light is less than the refractive index of the polymer layer 13, which makes the collimation light diverge when the collimation light enters the interface between the negative liquid crystal layer 14 and the polymer layer 13.

When the visual angle regulator is in a second working state, the collimation light perpendicular to the lower substrate 112 enters along the direction perpendicular to the optical axis direction of the negative liquid crystal layer 14. According to the negative liquid crystal layer 14 having the double refraction, the collimation light is divided into two lights. The second light is the extraordinary light, where the polarization direction of the extraordinary light is parallel to the long axis direction of the negative liquid crystal layer 14. The extraordinary light cannot generate refraction and propagation direction of the extraordinary light is unchanged. The first light is the ordinary light, where the ordinary light generates divergency when the ordinary light enters the interface between the negative liquid crystal layer 14 and the polymer layer 13.

The present disclosure provides the visual angle regulator. By providing the polymer layer 13 having the refractive index the same as the maximum refractive index of the extraordinary light and the polymer layer 13 having the linear grooved structure and the negative liquid crystal layer 14 having double refraction, when the electrodes are applied with a voltage, the negative liquid crystal molecules 141 generates deflection, which makes the propagation direction of the second light of the collimation light unchanged. When the electrodes are not applied with a voltage, the collimation light generates divergency because of the refraction.

Figure 10:
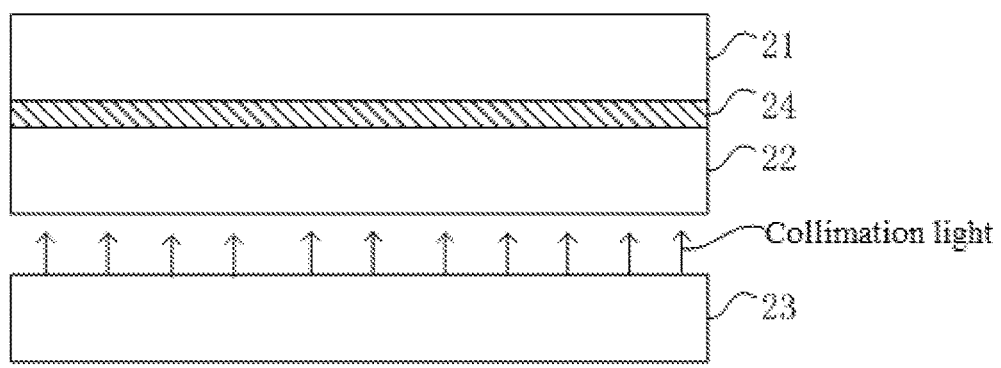
FIG. 10 is a structural diagram of a Liquid Crystal Display (LCD) of the present disclosure.

Please refer to FIG. 10, which is the structural diagram of the LCD of the present disclosure. The LCD of the embodiment of the present disclosure comprises: an LCD panel 21, a visual angle regulator 22, and a backlight 23, where a light incidence side of the LCD panel 21 comprises a lower polaroid close to a side of the visual angle regulator 22. The lower polaroid is not shown in drawings.

The visual angle regulator 22 is arranged between the LCD panel 21 and the backlight 23 and is attached to the LCD panel 21 by optical transparent glue 24. It should be understood that the fixed way of the LCD panel 21 and the visual angle regulator 22 is not limited to use the optical transparent glue, other fixed ways which can also be used are not disclosed in the specification.

A specific structure of the visual angle regulator 22 can refer to FIG. 1. The visual angle regulator 22 of the embodiment of the present disclosure comprises the substrates 11, the electrodes 12, the polymer layer 13, and the negative liquid crystal layer 14.

The substrates 11 comprise the upper substrate 111 and the lower substrate 112 opposite to the upper substrate 111, where the substrates 11 have a high light transmission. A first side of the upper substrate 111 is attached to the LCD panel 21 by the optical transparent glue 24, where the first side of the upper substrate 111 is away from the electrodes 12.

The electrodes 12 are arranged between the upper substrate 111 and the lower substrate 112, and the electrode comprises the upper electrode 121 attached to the upper substrate 111 and the lower electrode 122 attached to the lower substrate 112. The electrodes 12 provide the electric field having vertical direction for the negative liquid crystal layer 14, which causes negative liquid crystal molecules of the negative liquid crystal layer 14 to deflect. The vertical direction is perpendicular to the substrates 11.

The polymer layer 13 has a high light transmission, and the refractive index of the polymer layer 13 is same as the maximum refractive index of the extraordinary light for the negative liquid crystal layer 14. The polymer layer is arranged between the upper electrode 121 and the lower electrode 122, and the first side of the polymer layer 13 is attached to the upper electrode 121, and the second side of the polymer layer 13 is the linear grooved structure formed with periodic grooves. The cross-section of each of the grooves is a circular arc. It should be understood that the cross-section of each of the grooves can be semicircle or other similar shape, which are not disclosed in the specification.

The negative liquid crystal layer 14 is filled between the polymer layer 13 and the lower electrode 122.

In the embodiment of the present disclosure, the visual angle regulator can further comprise an alignment layer comprising the upper alignment layer and the lower alignment layer, where the upper alignment is arranged between the polymer layer and the negative liquid crystal layer, and the lower alignment layer is arranged between the lower electrode and the negative liquid crystal layer. The alignment layer is not shown in FIG. 1, however, according to content of the specification and common knowledge, a person of ordinary skill in the art can easily know the location of the alignment layer.

How to switch a wide visual angle and a narrow visual angle for the LCD will be further described in detail.

The operating principle of the visual angle regulator has been described in detail. Therefore, in order to be concise for the specification, it will not describe as follow.

In the embodiment of the present disclosure, when the visual angle regulator 22 is not applied with a voltage is in the first working state, namely, the visual angle regulator 22 is in the first working state, the backlight 23 emits the collimation light perpendicular to the lower substrate 112 of the visual angle regulator 22. The collimation light enters along the direction parallel to the long axis direction of the negative liquid crystal molecules 141; namely, the collimation light enters along the direction parallel to the optical axis direction of the negative liquid crystal layer 14. The negative liquid crystal layer 14 is isotropy and cannot generate the double refraction. At the same time, the refractive index of the negative liquid crystal layer 14 is the same as the refractive index of the ordinary light, and the refractive index of the negative liquid crystal layer 14 is less than the refractive index of the polymer layer 13. Combined with the feature of the grooves of the linear grooved structure of the polymer layer 13, the polymer layer 13 is regarded as concave lens, which makes the collimation light of the backlight 23 diverge when the collimation light enters the interface between the negative liquid crystal layer 14 and the polymer layer 13. The divergent light enters the LCD panel 21, and a display content of the LCD panel is displayed by the wide visual angle mode. Namely the LCD is in the wide visual angle mode.

In the embodiment of the present disclosure, when the visual angle regulator 22 is applied with a voltage, namely, the visual angle regulator 22 is in the second working state. The electrodes 12 are applied with a voltage, and the negative liquid crystal molecules 141 generate deflection. The polarization direction of the negative liquid crystal molecules 141 comprises the first direction parallel to the extension direction of the grooves of the linear grooved structure or the second direction perpendicular to the extension direction of the grooves of the linear groove structures.

According to the detail of the visual angle regulator 22 in the second working state, the collimation light is divided into two lights, where the first light is ordinary light and the second light is the extraordinary light. The polarization direction of the extraordinary light is parallel to the long axis direction of the negative liquid crystal molecules 141, and the propagation direction of the extraordinary light of the collimation light is unchanged. The polarization direction of the ordinary light is perpendicular to the optical axis direction of the negative liquid crystal layer 14, and the ordinary light generates refraction to diverge. The LCD has to filter the divergent light, which makes only the light perpendicular to the upper substrate 111 enter the LCD panel 21. Therefore, the display content of the LCD panel is displayed by the narrow visual angle mode. Namely the LCD is in the narrow visual angle mode.

That the LCD filters the divergent light is achieved by arranging location relationship of the extension direction of the grooves of the linear grooved structure and a light absorption axis direction of the lower polaroid of the LCD panel. The location relationship is divided into two situations, where the two situations relate to the polarization direction of the negative liquid crystal molecules 141 when the visual angle regulator 22 is applied with a voltage. The detail is as follow:

When the visual angle regulator 22 is applied with the first voltage, wherein the polarization direction of the negative liquid crystal molecules 141 is deflected to be parallel to the extension direction of the groove of the linear grooved structure, and the extension direction of the grooves of the linear grooved structure is perpendicular to the light absorption axis direction of the lower polaroid of the LCD panel, the divergent light is filtered, and only the light perpendicular to the upper substrate 111 enters the LCD panel 21.

When the polarization direction of the negative liquid crystal molecules 141 is deflected to be perpendicular to the extension direction of the grooves of the linear grooved structure, and the extension direction of the grooves of the linear grooved structure is parallel to the light absorption axis direction of the lower polaroid of the LCD panel, the divergent light is also filtered, and only the light perpendicular to the upper substrate 111 enters the LCD panel 21.

From the above, when the visual angle regulator 22 is not applied with a voltage, the backlight 23 emits the collimation light, and the collimation light generates refraction to diverge by the visual angle regulator 22. At this time, the LCD is in the wide visual angle mode. When the visual angle regulator 22 is applied with a voltage, the backlight 23 emits the collimation light, and the polarization direction of the extraordinary light is parallel to the long axis direction of the negative liquid crystal molecules 141, and the propagation direction of the extraordinary light of the collimation light is unchanged. The light with polarization direction which is perpendicular to the long axis direction of the negative liquid crystal molecules 141 is absorbed by the lower polaroid. At this time, the LCD is in the narrow visual angle mode.

The LCD of the embodiment of the present disclosure uses the visual angle regulator 22 which is arranged between the LCD panel 21 and the backlight 23. When the visual angle regulator 22 is applied with a voltage, the LCD is in the narrow visual angle mode. When the visual angle regulator 22 is not applied with a voltage, the LCD is in the wide visual angle mode. Therefore, the present disclosure solves the problem that the LCD only having the wide visual angle in prior art cannot achieve the switching between the wide visual angle mode and the narrow visual angle mode.

In order to clearly understand that the LCD switches between the wide visual angle mode and the narrow visual angle mode, the present disclosure will be further described in detail in accordance with application scenarios.

For example, the LCD of the present disclosure is used in smart phones. When users read information by the smart phone, and the users think that the information can be shared with people around them, the users can use the wide angle mode. Namely, the visual angle regulator 22 is not applied with a voltage, and the backlight 23 emits the collimation light and the collimation light generates refraction to diverge, which improves visual angle of the LCD.

When the users are shopping in the supermarket, the users choose to pay the expenditure by using Alipay online payment function through the phone. At that time, the users need to input Alipay account and password to login in, and the users need to input trade password to pay the expenditure. For the above operation process, the users are afraid information on the phone is seen by people around them. The users can use the narrow angle mode. Namely, the visual angle regulator 22 is applied with a voltage, which makes the light perpendicular to the upper substrate 111 enter the LCD panel 21 and makes the divergent light be absorbed by the LCD panel 21, further shrinking the visual angle of the LCD panel.

It should be understood that the present disclosure has been described with reference to certain preferred and alternative embodiments which are intended to be exemplary only and do not limit the full scope of the present disclosure as set fourth in the appended claims.

What is claimed is:

1. A Liquid Crystal Display (LCD), comprising
a backlight;
an LCD panel comprising a lower polaroid; and
a visual angle regulator attached to the LCD panel by optical transparent glue and arranged between the LCD panel and the backlight;
wherein the visual angle regulator comprises an upper substrate and a lower substrate opposite to the upper substrate, electrodes, a polymer layer, and a negative liquid crystal layer; the electrodes are arranged between the upper substrate and the lower substrate, the electrodes comprise an upper electrode attached to the upper substrate and a lower electrode attached to the lower substrate;
wherein the polymer layer is arranged between the upper electrode and the lower electrode, a first side of the polymer layer is attached to the upper electrode, and a second side of the polymer layer has a liner grooved structure formed with periodic grooves, an extension direction of each of the grooves of the linear grooved structure is either parallel or perpendicular to a light absorption axis direction of the lower polaroid of the LCD panel, and a cross-section of each of the grooves of the linear grooved structure is semicircular in shape;
wherein the negative liquid crystal layer is filled between the polymer layer and the lower electrode, a refractive index of the polymer layer is the same as a maximum refractive index of an extraordinary light of the negative liquid crystal layer.

2. The LCD as claimed in claim 1, wherein when the visual angle regulator is not with a applied voltage, the backlight emits collimation light, and the collimation light generates refraction to diverge by the visual angle regulator, and at this same time, the LCD is in a wide visual angle mode; and wherein when the visual angle regulator is applied with a voltage, the backlight emits the collimation light, and light with a polarization direction which is parallel to a long axis direction of the negative liquid crystal molecules has a propagation direction which is unchanged, and light with a polarization direction which is perpendicular to the long axis direction of the negative liquid crystal molecules is absorbed by the lower polaroid, and at this same time, the LCD is in a narrow visual angle mode.

3. The LCD as claimed in claim 1, wherein the visual angle regulator further comprises an alignment layer comprising an upper alignment layer and a lower alignment layer, the upper alignment is arranged between the polymer layer and the negative liquid crystal layer, and the lower alignment layer is arranged between the lower electrode and the negative liquid crystal layer.

4. The LCD as claimed in claim 2, wherein the visual angle regulator further comprises an alignment layer comprising an upper alignment layer and a lower alignment layer, the upper alignment is arranged between the polymer layer and the negative liquid crystal layer, and the lower alignment layer is arranged between the lower electrode and the negative liquid crystal layer.

5. The LCD as claimed in claim 3, wherein when the visual angle regulator is applied with a voltage, the polarization direction of the negative liquid crystal molecules comprise a first direction parallel to the extension direction of the grooves of the linear grooved structure or a second direction perpendicular to the extension direction of the grooves of the linear grooved structure.

6. The LCD as claimed in claim 4, wherein when the visual angle regulator is applied with a voltage, the polarization direction of the negative liquid crystal molecules comprises a first direction parallel to the extension direction of the grooves of the linear grooved structure or a second direction perpendicular to the extension direction of the grooves of the linear groove structure.

7. A visual angle regulator, comprising
an upper substrate and a lower substrate opposite to the upper substrate,
electrodes comprising an upper electrode attached to the upper substrate and a lower electrode attached to the lower substrate;
a polymer layer arranged between the upper electrode and the lower electrode; and
a negative liquid crystal layer filled between the polymer and the lower electrode;
wherein the electrodes are arranged between the upper substrate and the lower substrate, a first side of the polymer layer is attached to the upper electrode, and a second side of the polymer layer has a linear grooved structure formed with periodic grooves, and a cross-section of each of the grooves of the linear grooved structure is semicircle in shape, a refractive index of the polymer layer is the same as a maximum refractive index of an extraordinary light of the negative liquid crystal layer.

8. The visual angle regulator as claimed in claim 7, wherein when the electrode is not applied with a voltage, and collimation light perpendicular to the lower substrate enters an interface between the negative liquid crystal layer and the polymer layer, the collimation light generates divergency because of refraction, and at this same time, the visual angle regulator is in a first working state; and wherein when the electrode is applied with a voltage, the negative liquid crystal molecules generate deflection, light with polarization direction which is parallel to the long axis direction of the negative liquid crystal molecules has a propagation direction which is unchanged, and at this time, the visual angle regulator is in a second working state.

9. The visual angle regulator as claimed in claim 7, further comprising an alignment layer, wherein the alignment layer comprises an upper alignment layer and a lower alignment layer, the upper alignment is arranged between the polymer layer and the negative liquid crystal layer, and the lower alignment layer is arranged between the lower electrode and the negative liquid crystal layer.

10. The visual angle regulator as claimed in claim 8, further comprising an alignment layer, wherein the alignment layer comprises an upper alignment layer and a lower alignment layer, the upper alignment is arranged between the polymer layer and the negative liquid crystal layer, and the lower alignment layer is arranged between the lower electrode and the negative liquid crystal layer.

11. The visual angle regulator as claimed in claim 9, wherein when the negative liquid crystal molecules generate deflection, polarization direction of the negative liquid crystal molecules comprises a first direction parallel to an extension direction of the grooves of the linear grooved structure or a second direction perpendicular to the extension direction of the grooves of the linear grooved structure.

12. The visual angle regulator as claimed in claim 10, wherein when the negative liquid crystal molecules generate deflection, polarization direction of the negative liquid crystal molecules comprises a first direction parallel to an extension direction of the grooves of the linear grooved structure or a second direction perpendicular to the extension direction of the grooves of the linear grooved structure.

13. The visual angle regulator as claimed in claim 7, wherein a cross-section of each of the grooves of the linear grooved structure is a circular arc.

14. An LCD comprising:
a backlight;
an LCD panel comprising a lower polaroid; and
a visual angle regulator attached to the LCD panel and arranged between the LCD panel and the backlight;
wherein the visual angle regulator comprises an upper substrate and a lower substrate opposite to the upper substrate, electrodes, polymer, and a negative liquid crystal; the electrodes are arranged between the upper substrate and the lower substrate, the electrode comprises an upper electrode attached to the upper substrate and a lower electrode attached to the lower substrate;
wherein the polymer layer is arranged between the upper electrode and the lower electrode; a first side of the polymer layer is attached to the upper electrode; and a second side of the polymer layer has a liner grooved structure formed with periodic grooves; an extension direction of each of the grooves of the linear grooved structure is either parallel or perpendicular to a light absorption axis direction of the lower polaroid of the LCD panel, and a cross-section of each of the grooves of the linear grooved structure is semicircle in shape;
wherein the negative liquid crystal layer is filled between the polymer layer and the lower electrode; a refractive index of the polymer layer is the same as a maximum refractive index of an extraordinary light of the negative liquid crystal layer.

15. The LCD as claimed in claim 14, wherein when the visual angle regulator is not applied with a voltage, the backlight emits collimation light, and the collimation light generates refraction to diverge by the visual angle regulator; and at this same time, the LCD is in a wide visual angle mode; and wherein when the visual angle regulator is applied with a voltage, the backlight emits the collimation light, and the light with a polarization direction which is parallel to a long axis direction of the negative liquid crystal molecules has a propagation direction which is unchanged, and light with a polarization direction which is perpendicular to the long axis direction of the negative liquid crystal molecules is absorbed by the lower polaroid, and at this same time, the LCD is in a narrow visual angle mode.

16. The LCD as claimed in claim 14, wherein the visual angle regulator further comprises an alignment layer comprising an upper alignment layer and a lower alignment layer, the upper alignment is arranged between the polymer layer and the negative liquid crystal layer, and the lower alignment layer is arranged between the lower electrode and the negative liquid crystal layer.

17. The LCD as claimed in claim 15, wherein the visual angle regulator further comprises an alignment layer comprising an upper alignment layer and a lower alignment layer; the upper alignment is arranged between the polymer layer and the negative liquid crystal layer, and the lower alignment layer is arranged between the lower electrode and the negative liquid crystal layer.

18. The LCD as claimed in claim 16, wherein when the visual angle regulator is applied with a voltage, the polarization direction of the negative liquid crystal molecules comprises a first direction parallel to the extension direction of the grooves of the linear grooved structure or a second direction perpendicular to the extension direction of the grooves of the linear grooved structure.

19. The LCD as claimed in claim 17, when the visual angle regulator is applied with a voltage, the polarization direction of the negative liquid crystal molecules comprises a first direction parallel to the extension direction of the grooves of the linear grooved structure or a second direction perpendicular to the extension direction of the grooves of the linear grooved structure.

20. The LCD as claimed in claim 14, wherein the visual angle regulator is attached to the LCD panel by using optical transparent glue.

* * * * *